R. B. COAR.
PIPE JOINT.
No. 100,726. Patented Mar. 15, 1870.
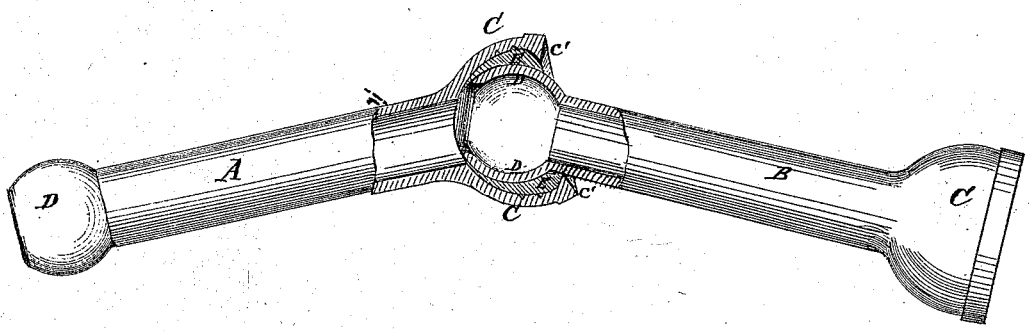

United States Patent Office.

ROBERT B. COAR, OF JERSEY CITY, NEW JERSEY.

Letters Patent No. 100,726, dated March 15, 1870.

IMPROVEMENT IN PIPE-JOINTS.

The Schedule referred to in these Letters Patent and making part of the same.

*To all whom it may concern:*

Be it known that I, ROBERT B. COAR, of Jersey City, in the county of Hudson, and State of New Jersey, have invented a new and useful Improvement in Pipe-Joints; and I do hereby declare that the following is a full, clear, and exact description thereof, which will enable others skilled in the art to make and use the same, reference being had to the accompanying drawings forming part of this specification, in which—

The figure is a detail sectional view of my improved pipe-joint.

My invention has for its object to furnish an improved pipe-joint, which shall be so constructed and arranged as to form a flexible joint, and one which at the same time will be close and will not allow the pipe to be pulled apart; and It consists in the joint constructed as hereinafter more fully described.

A and B represent two lengths of pipe connected to each other by means of my improved joint.

The end C of the lengths of pipe is made bell-shaped and with an inwardly-projecting ring flange, $c'$, around its mouth, as shown in the figure, thus making the interior diameter greater than the diameter of the mouth of the said bell C.

The end D of the pipe is made spherical and of such a size as to just enter the mouth of the bell C.

E is the soft metal packing which is run into the bell C, around the spherical end or spigot of the pipe B. The inner surface of the interior or larger part of the cavity of the bell C has one or more annular grooves formed around it, as shown in the figure, which grooves, in connection with the flanged mouth $c'$ of the bell C, securely connect the soft metal E with and to the said bell, so that the said soft metal E may remain stationary, while the ball or spigot D turns freely within it.

By this construction the soft metal E will be dovetailed into the bell C $c'$; that is to say, the body of the said soft metal will be thicker in the inner or middle part of the said bell than at its mouth, which will most effectually prevent the ball or spigot D from being drawn out of the said bell, while allowing it to rotate or turn freely. In fact the only effect of attempting to draw the spigot out will be to pack the soft metal more closely in place. This construction of the joint also allows the soft metal packing to be tamped when necessary to compensate for shrinkage.

I am aware that joints have been formed with soft metal heretofore; but the diameter of the spigot has been made much smaller than that of the bell, the wedge packing has never been employed so as to act by its form against any tendency of said spigot to draw out, and no serrations on the concave of the bell have ever been used to hold the packing firmly to its position.

Having thus described my invention,

I claim as new, and desire to secure by Letters Patent—

1. The wedge-shaped soft metal packing E E arranged as specified, so that any attempt to separate the joint will only make the packing bind more closely.

2. The combination of a spherical spigot, D, and bell C $c'$, when the greatest diameter of the former is almost exactly equal to that of the opening in the latter, the difference being barely sufficient to allow the first to pass into the second, as set forth.

3. The combination of soft metal wedge E with a bell C $c'$, having notches cut in its concave side to retain the metal firmly in place, as set forth.

The above specification of my invention signed by me this 8th day of December, 1869.

ROBT. B. COAR.

Witnesses:
GEO. W. MABEE,
JAMES T. GRAHAM